A. J. BENNETT.
LEMON SQUEEZER.
APPLICATION FILED DEC. 5, 1908.
912,443.
Patented Feb. 16, 1909.
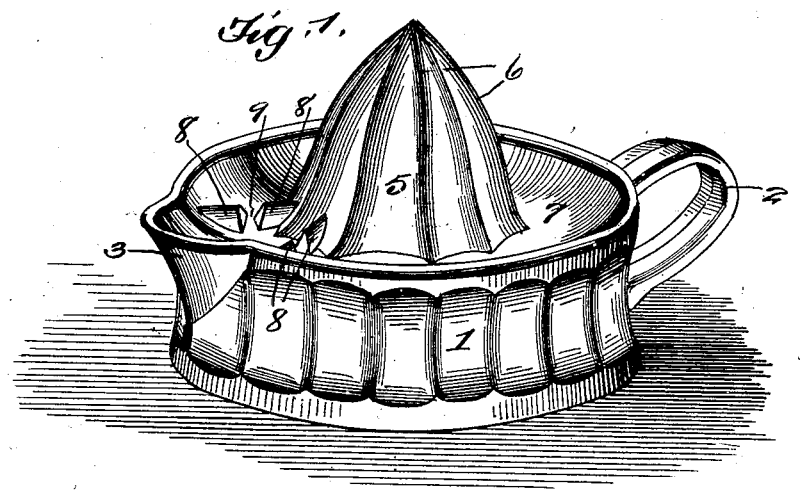
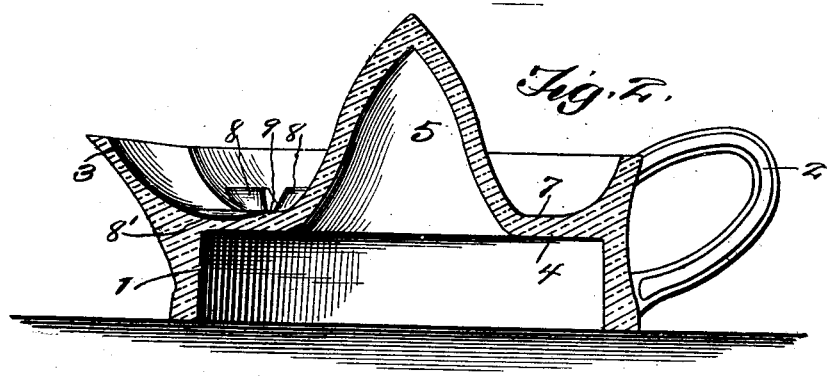
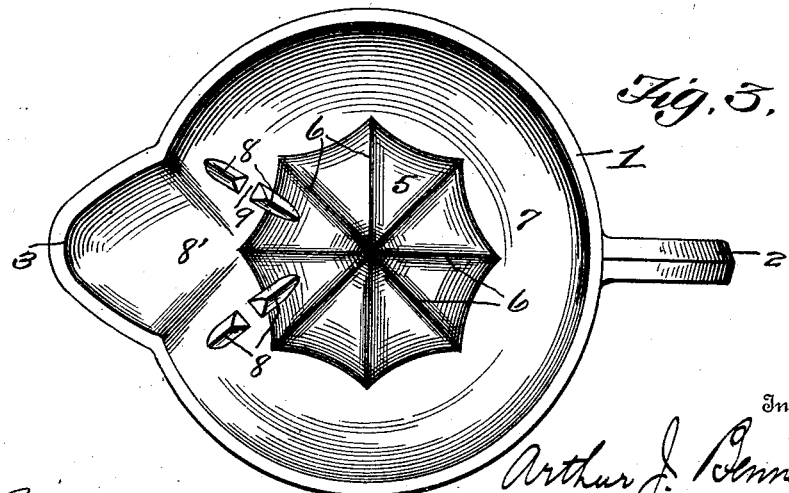
Witnesses
Inventor
Arthur J. Bennett
By
Attorney

UNITED STATES PATENT OFFICE.

ARTHUR J. BENNETT, OF CAMBRIDGE, OHIO.

LEMON-SQUEEZER.

No. 912,443.           Specification of Letters Patent.          Patented Feb. 16, 1909.

Application filed December 5, 1908. Serial No. 466,095.

*To all whom it may concern:*

Be it known that I, ARTHUR J. BENNETT, a citizen of the United States, residing at Cambridge, in the county of Guernsey and State of Ohio, have invented certain new and useful Improvements in Lemon-Squeezers, of which the following is a specification.

This invention relates to improvements in lemon squeezers, and relates more particularly to an improved type of dam whereby the seeds of the lemon are held in restraint during the pouring of the lemon juice, subsequent to the squeezing operation, into a receptacle or other receiving vessel.
Further the invention aims to generally improve, simplify and increase the efficiency of articles of this class, further and other objects being later manifested.

In the drawings: Figure 1, is a view in perspective of the improved article. Fig. 2, is a vertical sectional view of Fig. 1, and Fig. 3, is a top plan view of Fig. 1.

The article as now contemplated includes an annular rim 1, formed with a handle 2, and a pouring or discharge mouth 3, there being a partition 4, midway of the height of the rim. A cone 5, formed with ribs 6, is made integral with partition 4, and forms in conjunction with rim 1, a channel 7. The channel 7, at the point where the pouring mouth communicates therewith is formed with a depressed or deepened part 8', to facilitate the pouring of the accumulated lemon juice and to further assist in perfect draining of the channel during the pouring operation.

Extending across the channel 7, are two dams which are arranged on opposite sides of the pouring mouth 3 and which are divergently related, each dam being composed of a pair of vertical lugs 8 which have their outer ends contacting with the rim 1, and the cone 5, and have a V-shaped space 9 between their inner ends. Each lug has its opposite sides beveled, to form a sharp top cutting edge, so as to assist the ribs 6, of cone 5, in performing their function during the expressing of the lemon. The purpose and function of the dams is to engage and hold in restraint any seeds which may have accumulated in the channel 7, during the process of expressing, at the time the lemon juice is being poured from the discharge mouth 3. The juice readily passes through the space 9, between the broken dams, and since said space is V-shaped being widest at the top, the juice can easily flow over or past any seed or seeds which may have lodged in said space of the broken dams. It will be further observed that during the act of expressing the evident tendency of the broken dams is to catch the seeds in the V-shaped space thereof so as to prevent same from entering the depression or well 8' which lies directly to the rear of pouring mouth 3.

The whole structure is preferably formed of one piece of glass.

What is claimed is:—

1. A lemon squeezer composed of an annular rim, a pouring mouth integral with said rim, a partition integral with the rim and extending midway of the height thereof, a ribbed cone centrally located on the partition forming an annular channel in conjunction with said rim, and a pair of dams located in the channel on opposite sides of said pouring mouth, each dam consisting of a pair of vertically disposed lugs which at their outer ends contact with the rim and cone and which have their inner ends separated by a V-shaped space, said lugs having their sides beveled to form a sharp top edge.

2. A lemon squeezer composed of an annular rim, a ribbed cone forming a channel in conjunction with said rim, a pouring mouth communicating with said channel, and a pair of broken dams arranged on opposite sides of said pouring mouth and extending across the channel to contact with said rim and cone.

3. A lemon squeezer composed of a rim, a ribbed cone forming a channel in conjunction with said rim, a pouring mouth communicating with said channel, and dams arranged across said channel on opposite sides of the pouring mouth, said dams having their top edges sharpened.

4. A lemon squeezer composed of a rim, a ribbed pyramidal-like element forming a channel in conjunction with said rim, a pouring mouth communicating with said channel, and a pair of dams on opposite sides of said pouring mouth arranged to extend across said channel between said rim and element.

In testimony whereof I affix my signature, in presence of two witnesses.

ARTHUR J. BENNETT.

Witnesses:
    W. C. MCCARTNEY,
    FREEMAN T. EAGLESON.